March 5, 1963 E. C. RYAN ETAL 3,079,911
HEATING DEVICE
Filed July 6, 1959 2 Sheets-Sheet 1

United States Patent Office 3,079,911
Patented Mar. 5, 1963

3,079,911
HEATING DEVICE
Edward C. Ryan, 541 Wellington, Apt. 3, Chicago, Ill., and Raymond E. Reed, Algonquin, Ill.
Filed July 6, 1959, Ser. No. 825,306
9 Claims. (Cl. 126—263)

The present invention concerns exothermic chemical heating devices and more particularly relates to such a device which is especially adapted to and useful for the heating or warming of foods.

More and more food is being sold in a form suitable for immediate consumption. For example, fried chicken, french fried shrimp, pizza pies, steaks, ribs, chop suey, pies, rolls, and the like are readily available from food stands and restaurants on a take-home basis. Unfortunately, this food, even though cooked to order and placed immediately in a container and then in a bag, loses its retained heat rapidly and usually must be reheated by the consumer before use.

The reheating of cooked food is not only a nuisance, but it decreases the palatability of the food. Ideally, for health and sanitation reasons, cooked food should be chilled quickly and refrigerated or maintained in a hot condition until eaten. This minimizes bacterial decomposition of the food which can go on quite rapidly when hot food, as it cools, reaches temperatures around 98° F.

Much effort has been expended in the past in attempting to provide exothermic chemical heating units suitable for cooking or heating canned foods in the container, it being appreciated that such a device would be most advantageous for military usage, as well as for picnics, barbecues, etc. Yet despite these efforts, the numerous suggestions resulting therefrom, and a substantial demand for a portable container with built-in heating unit, little progress has been made in providing an acceptable commercial device for fulfilling this need. But the problem has proved more difficult than initially would appear. Typically, the heating units heretofore proposed for the purpose have been heavy, bulky, costly, inefficient devices which fail to provide a satisfactory solution to the problem and hence have had little or no commercial acceptance.

Our invention has as its primary objective to provide an exothermic chemical unit for food heating or warming which overcomes the difficulties of those previously proposed. More particularly our invention aims to provide such a unit which is highly efficient, yet light and inexpensive, so that it can be incorporated in a food container at relatively small cost. Our device is not only inexpensive and simple to make, but is also well adapted to manufacture on automatic machines. The preferred chemicals used are not only of low cost and highly effective but are also perfectly safe in use. Most important, they are packaged in such a way that their action is concentrated and directed into the food at maximum efficiency, that the device will withstand the rigors of shipment and handling but yet is simple to operate, and that the device can be used as an adjunct to, or as integral part of, a low cost food container.

The foregoing and other objects and advantages of our invention will be more fully apparent from the following more particular description in conjunction with the accompanying drawings, of preferred embodiments of the invention. In the drawings.

Figure 1:
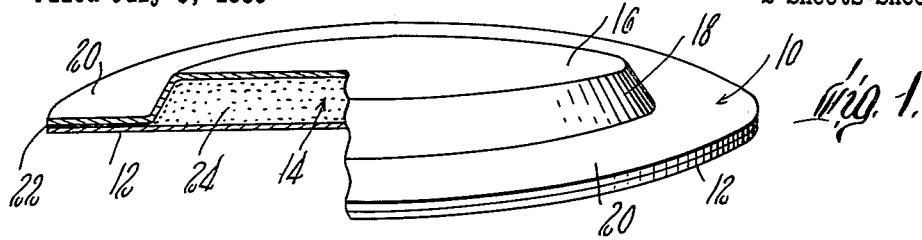
FIG. 1 is a perspective view of a heating device according to the invention with part broken away to show interior construction in vertical section.

Briefly stated, one feature of our invention is the provision of a heating device having a central chemical-containing compartment of relatively small depth and large transverse area which is in turn surrounded by a rim which provides means for associating and supporting the device in heat transfer relation to the receptacle of which the contents are to be subjected to heating. One or both of the opposite walls or facings which are joined at their edges to form the compartment may be of flexible material such as foil, woven or unwoven textile material, paper and the like. The rim, however, is substantially inflexible and is of such strength and rigidity that the device as a whole is substantially inflexible and supportable substantially without sagging by edge engagement of the rim with supporting structure.

In a preferred form of the device, the rim is the edge portion of a sheet of semi-rigid material such as thin metal or plastic, the mid-portion of which is indented to form a cavity for a body of the heating chemical mixture. A sheet of one of the flexible materials is then placed over this cavity and attached to the surrounding rim to form with the first material a completed device having a closed central chemical-containing compartment and surrounding rigid rim by which the device is supportable. In another form of the device, the chemical compartment is formed between two sheets of flexible or semi-flexible materials joined at their edges about the compartment or to an intervening cement layer or reinforcing ring in such manner as to provide a rim having the strength and rigidity characteristics mentioned above.

Our heating unit may be used in several ways and our invention comprehends a cooperating receptacle structure for enabling such usage. The device may be used as an auxiliary heating unit for attachment at the time of use, in which case the unit may be attached to the container as a heater for contained foods. In such case, the unit will usually be attached beneath the bottom of the container with either face in the area overlying the chemical-containing compartment closely underlying or pressed against the underside of the container bottom to insure adequate heat transfer through the container bottom. In one preferred embodiment of the invention, as hereinafter appears, such attachment is provided by means of a groove in a down-turned edge around the container bottom into which the aforesaid rim of the heating unit is adapted to seat, thus providing an effective yet inexpensive attaching device.

In another manner of use, our heating unit of the preferred form mentioned above may be attached to the side walls of a receptacle so that its rigid or semi-rigid face forms the actual bottom on which the contents of the receptacle rest. This may be done by removably attaching the heating device to the container wall, as in the manner described above, or by utilizing a receptacle bottom to provide the more rigid face of the device, indenting the central portion thereof to provide a cavity for the heating composition and also to provide a marginal rim to which the flexible facing may be adhesively secured.

Referring now to the drawing, FIG. 1 illustrates a heating device according to the invention having opposed walls 10 and 12 joined together at their edges. The wall 10 is relatively rigid and inflexible and may be formed of metal, such as thin sheet or thick foil of aluminum of the order of .002 inch or more thickness, or a similar sheet of plastic of suitable heat-resistant properties and strength which will usually be somewhat thicker. The wall 12 is relatively flexible and may be formed of readily puncturable, impermeable material such as thin foil, or of water permeable material such as woven or unwoven textile material, paper and the like of sufficiently fine mesh to prevent the chemical contained between the walls from sifting through.

Wall 10 is, as shown, formed of a single sheet material which is centrally indented to provide a cavity 14 having an end wall 16 and a side wall 18 angularly connected to the end wall. A substantial margin is left between the central indented portion and the marginal edge of the wall 10 to provide a flange or rim 20 surrounding the cavity. As shown and preferably end wall 16 and rim 20 are substantially flat. Flexible wall 12 is secured to rim 20, as shown by a band of adhesive 22 which may, if the material used in making 12 be of suitable type, such as thermo-adhesive fabric or paper, be formed by rendering such material itself adhesive, as by heat and pressure or otherwise. It is important that the adhesive 22 be of such character as to form a strong bond between the rim 20 and material 12, and further that it be continuous to insure against leakage of the chemical from between the flange and material. To insure both these qualities, we not only select an adhesive which is a good bonding agent for the two surfaces to be joined, but we also make the adhesive band of substantial width, preferably of the order of 0.05 inch or more.

Cavity 14 is substantially filled with a chemical composition 24 which gives off heat upon activation with water. This exothermic heating composition is preferably of the type which produces heat primarily by oxidation of a metal, that is by changing the valence level of the metal, which may take place through its electrolytic displacement of another ion. Desirably, this may be a finely divided mixture of metal or metals and electrolyte as disclosed in U.S. patents to Raymond E. Reed, Nos. 2,040,406 and 2,040,407. Suitable compositions of the above type may be formulated which are highly exothermic but do not swell appreciably, and therefore the cavity 14 may be substantially completely filled with these preferred compositions without danger of the material 12 bursting upon activation of the chemical. A suitable formula for the composition 24 of the preferred type is as follows:

| | Percent Wt. |
|---|---|
| Al | 34.0 |
| $CuSO_4 \cdot 1H_2O$ | 1.5 |
| $KClO_3$ | 17.0 |
| Activated charcoal | 2.4 |
| $CaSO_4 \cdot \tfrac{1}{2}H_2O$ | 45.1 |

Our heating device is suitable for many uses, but is primary suited for use in heating the contents of receptacles, such as those used to transport or serve cooked foods, or containing liquids or chemicals to be heated or volatilized. For such purpose the heating device may be fabricated as a separate unit for application to the receptacle or it may be formed with one of its walls an interal part of the receptacle, as will now be brought out in discussing the remaining figures of the drawing which show various applications of our device to heating the contents of receptacles.

Figure 2:
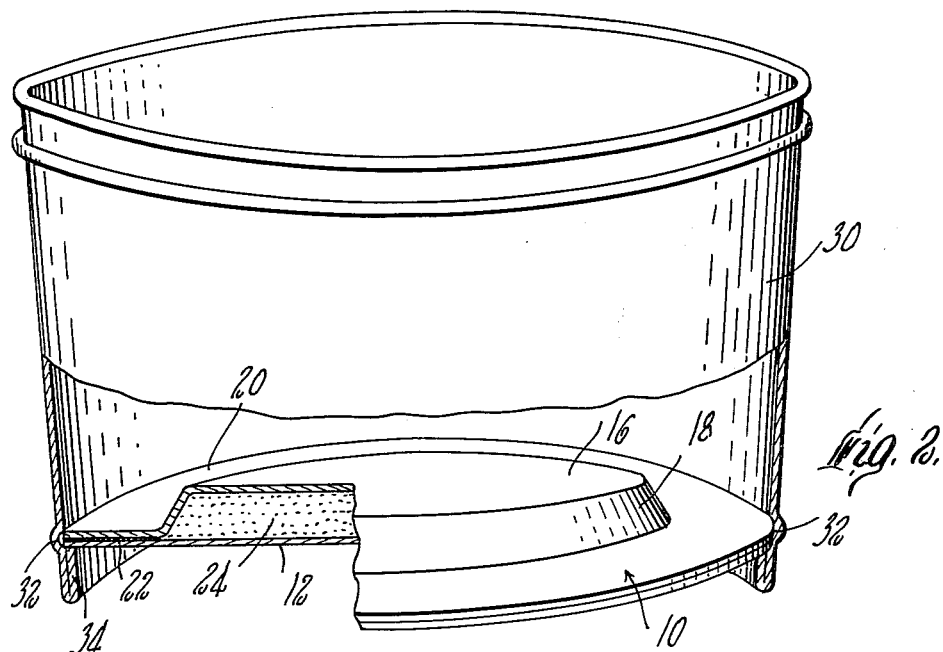
FIG. 2 is a side elevation of a receptacle embodying the invention with parts broken away to show interior construction.

FIG. 2 shows a receptacle embodying the invention, the heating device as above described being made separately and subsequently assembled with a specially constructed receptacle side wall to form the bottom of the receptacle. In this embodiment, as is preferred, the wall 10 of the heating device forms the receptacle bottom, contacting and supporting the contents as is preferred for maximum heating efficiency. The receptacle illustrated in FIG. 2 is of generally frusto-conical shape with the wider end constituting the top, and may be a cup or pail, depending on the size. The side wall 30 of the receptacle may be of any suitable material such as thin metal or plastic or water-proofed cardboard or paper which is resilient to the extent that it is slightly outwardly expandable under pressure. Near the smaller diameter end or base of wall 30, interiorly thereof, is provided a groove 32 which is of substantially uniform distance from the base of wall 30 and extends completely around the axis of the wall. Groove 32 may conveniently be formed as shown by indenting the material of the wall.

A heating device as separately illustrated in FIG. 1, has the outer edge of its rim 20 shaped to conform to the cross-sectional shape of the receptacle wall, in this case circular, and of a dimension such as to fit snugly within the groove 32. Thus, the heating device forms the receptacle bottom, the wall 10 of the device being uppermost and thus contacting the contents of the container to be heated. The flexible wall 12 is exposed below the container bottom so that activation of the heating chemical may be readily effected when desired simply by inverting the receptacle, puncturing the wall 12 if it be impervious, applying water to the chemical through the punctured or porous wall, and turning the container right side up as soon as the water has thoroughly penetrated the chemical composition. With the application of water the composition will to some extent become coherent and if the openings punched be small or in the form of slits, sifting out of the contents will not occur to any appreciable extent.

In this embodiment, the side wall and self-heating base are readily assembled, at the factory or by the user, simply by inserting the heating device in the larger open end of the side wall and pressing the outer edge of its rim 20 into groove 32 by pressing the device toward the smaller open end of the side wall, causing the wall to expand slightly to permit the rim edge to seat in the groove by a snap action. Preferably, as shown, the bottom end of wall 30 is turned back on itself as at 34, with its end flush with the bottom of the groove to provide a ledge serving as additional support for the heating device. If desired, any possible leakage between the edge of flange 20 and surrounding receptacle side wall may be prevented by adhesively uniting the two, as by heat sealing or by means of a sealing compound contained in the groove 32.

Figure 4:
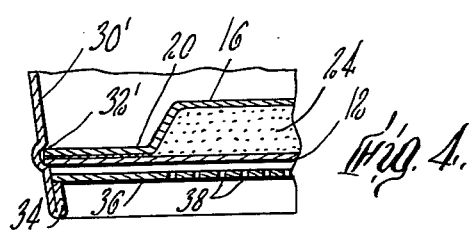
FIG. 4 is a fragmentary vertical cross-section view illustrating modified construction of the receptacle shown in FIG. 2.

The modification illustrated in FIG. 4 differs from that of FIG. 2 in that the receptacle has, in addition to the side wall 30' an outer bottom wall 36 which may be integral with or joined to the side wall. The groove 32' is spaced above the bottom wall 36 so that when the edge of the rim 20 of the heating device is seated therein, the under surface 12 of the device is slightly spaced above the receptacle bottom 36. In this construction, the heating device is first activated as above described, then inserted through the larger end of the receptacle in the same manner as in the case of FIG. 2 until the rim edge snaps into groove 32'. In this embodiment, it will be noted, the bottom wall 36, particularly if spaced below the heating device as shown, provides a desirable insulating barrier. Preferably, as shown, the mid portion of wall 36 is provided with apertures 38 for the escape of gases generated by the heating composition. We have found that provision for free escape of such gases is important for proper functioning of heating compositions of the type we prefer to employ. Also in this embodiment the heating device will be activated before it is applied to the receptacle, as may also be done with the device of FIG. 2.

Figure 3:
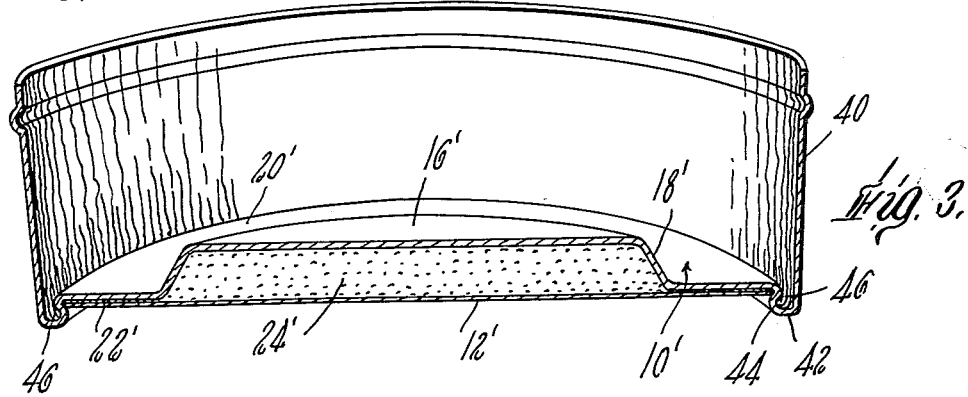
FIG. 3 is a vertical transverse section view of another receptacle embodying the invention.

FIG. 3 illustrates another form of receptacle embodying a modification of the heating device of FIG. 1 in that the wall 10' conforming to the wall 10 of the device shown in FIG. 1 is actually formed of the receptacle bottom. The receptacle, shown as round though it, like the device of FIG. 2, may have other shapes, is preferably formed of a single piece or sheet of material 40 which is shaped to provide an upstanding marginal side wall and a bottom which is doubly indented toward the open end of the receptacle. The first indentation extends close to the margin of the container bottom to provide narrow, inwardly extending portion 42 and upwardly extending portion 44, together defining, with the side wall, a small trough or gutter 46 open interiorly of the receptacle. The second indentation, interiorly of the first leaves a substantially flat rim 20' extending inwardly from portion 44, a portion 18' inclined upwardly from rim 20' and a flat central portion 16', the portions 16', 18' and 20' corresponding to the portions 16, 18, and 20 of the device of FIG. 2. As in that device, a flexible sheet material 12' is secured to the underside of rim 20' to close the cavity formed by portions 16' and 18' which is filled with chemical heating composition 24'.

It will therefore be appreciated that the heating device in the receptacle of FIG. 3 is the same as that in FIGS. 1 and 2 except that its wall 10 is an integral part of the receptacle. It may be activated in the same manner as described in connection with the receptacle of FIG. 2. By utilizing in this manner the bottom wall of the container, a saving in material is effected as compared with the device of FIG. 4 and there is no possibility of leakage from the receptacle. The trough 46 provides a desirable feature where juices, syrups or gravy are present, as in the case of many foods, since these tend to collect in the trough away from the heated surfaces 16' and 18' where they may be kept warm without substantial loss of their liquid content which may be excessive if they are in contact with the heated surfaces.

Figure 5:
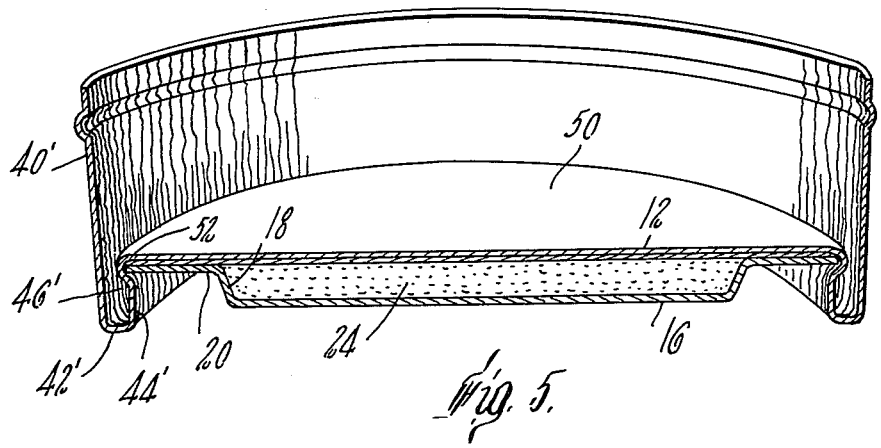
FIG. 5 is a fragmentary vertical cross-section view of a modification of the receptacle of FIG. 3.

FIG. 5 shows a receptacle similar to that of FIG. 3, but adapted to receive the heating device of FIG. 1 as a supplemental bottom. In this form, the receptacle, also preferably formed of a single sheet material 40', has its bottom given the first but not the second indentation described for the device of FIG. 3 to provide inwardly and upwardly extending portions 42' and 44' respectively, and a flat portion 50 constituting the remainder of the bottom. The wall portion 44' is curved outwardly somewhat toward its upper end to form a channel or groove 52 around the edge of mid portion 50 into which the peripheral edge of rim 20 of the heating device, of corresponding size and shape, may be seated with a snap fit. The material 40' is sufficiently resilient to permit the wall portion 44' to yield outwardly, thus permitting forced seating of the rim 20 in groove 52, portion 44' then resuming its original shape to provide supporting material below the flange so that the heating device is firmly coupled to the receptacle bottom. As shown, portion 44' is preferably of sufficient height to maintain the heating device clear of any flat supporting surface on which the receptacle may be rested.

In the device of FIG. 5 the heating device is shown as inverted relative to its position in FIGS. 2–4. While this is not essential, it has the advantage of added heat of condensation of steam from the heating unit which is forced to contact the receptacle bottom instead of escaping freely downwardly. The device of FIG. 5 has been found to be of comparable efficiency in heating the container contents to the other forms shown and it has the advantage that it may readily be assembled by the user. In the use of this form of the invention, water will be supplied to the heating chemical while the heating device is removed from the container if it is coupled to the container in the position shown in FIG. 5. If the heating device is coupled in the reverse position, then activation may take place after coupling, in the same manner as the embodiment of FIG. 4. It will be observed that the embodiment of FIG. 5 also provides a marginal trough 46' with the advantages mentioned above.

Figure 6:
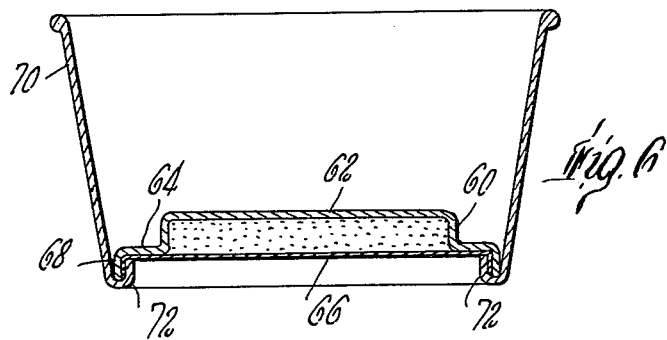
FIG. 6 is a vertical cross-section view of a receptacle and heating device of modified construction.

FIG. 6 shows a modified form of heating device and arrangement for associating it with a receptacle wall to form the bottom thereof. The heating device of this modification is similar to that of FIG. 1 in that it has one face formed of a sheet of relatively rigid material indented centrally to form a chemical container with upstanding side walls 60 and flat top 62 with surrounding rim 64 to which the flexible sheet 66 is adhesively secured to close the container. However, in this form the outer edge of the rim is turned downwardly at 68. A receptacle side wall 70 has its bottom edge inwardly and upwardly turned at 72 to form an upwardly opening groove in which rim edge 68 is seated, so that the device forms the actual bottom of the receptacle.

Figure 7:
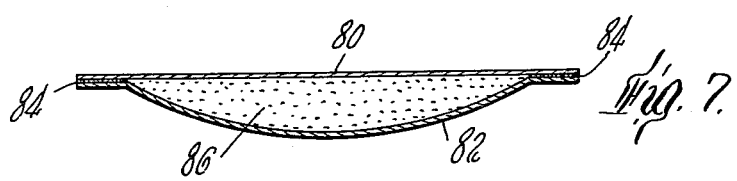
FIG. 7 is a vertical cross-section view of a modified form of the heating device.

FIG. 7 shows another modification of the heating device in which both walls of the chemical compartment are formed of flexible material but are connected at their edges to a substantially rigid rim. As shown, the flexible facings 80 and 82, which may be of any of the flexible materials mentioned above, are joined at their side edges by a layer of cementing plastic 84 to form a containing compartment for the chemical 86. The laminations at the edge together with the cement layer provide a rim of the requisite rigidity and strength to render the device as a whole substantially inflexible and supportable without sagging by engagement of the rim only with supporting structure. A ring of metal or other reinforcing material may be included if desired between the connected facings in the rim. This form of the device may be utilized by association with a container side wall, using the rim as the supporting medium as in the embodiments previously discussed. Where one of the facings 80 or 82 is to be exposed to the container contents it will ordinarily be of foil or other impervious flexible material. The device of FIG. 7 may present some advantage from a cost standpoint but in general it is preferred to have one of the facings at least semi-rigid as in the preceding figures as this provides a stronger, better self-sustaining structure, particularly in the larger sizes.

Figure 8:
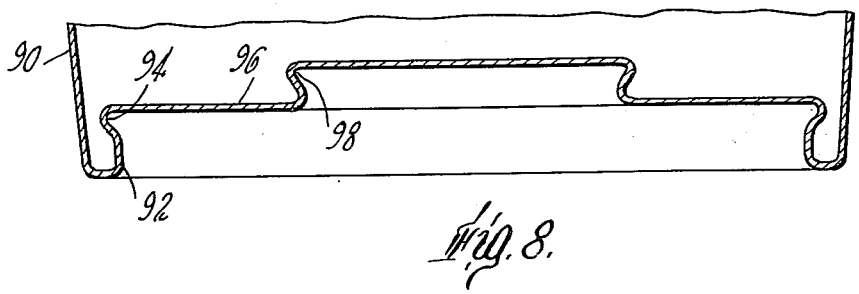
FIG. 8 is a fragmentary vertical cross-section view of the bottom of a large size container of special construction for receiving two heating devices according to the invention.

FIG. 8 shows a receptacle bottom structure similar to that of FIG. 5 but modified to adapt it to receive two of the heating devices, as may be desirable for larger size containers. In this form of receptacle, the bottom is provided with two concentric indentations, the larger at the lower edge of the receptacle side wall 90 providing an inwardly, upwardly and outwardly extending portion 92 providing a first groove 94 for the reception of a heating device rim, and a flat overlying bottom portion 96, the second indentation at the inner edge of portion 96 providing a like structure with a second rim receiving groove 98 of smaller diameter. In use, a small diameter heating unit may be activated and inserted in the inner cavity with its rim fitting into groove 98, and a larger diameter unit similarly activated and supported in the groove 94 to underlie and surround the first unit.

The receptacles and heating devices may obviously have other shapes than those chosen to illustrate the invention. The receptacle walls may be formed of metal such as aluminum, copper or steel or papers or cardboard, pressed cellulosic material, plastics and the like. A similar choice of materials is available for the relatively inflexible wall of the heating device, bearing in mind that this wall, or at least the rim thereof should be stiff enough to maintain its shape even under substantial weight and to permit the device to be supported at its edges only, without sagging under load of container contents. Thin gauge metal is preferred for this part, particularly where this surface is the one through which the desired heat transfer takes place and such materials are also desirable where this surface is to contact foods. The provision of a retaining groove in the receptacle side wall to receive the support rim of the heating device is desirable but it will be appreciated that a friction fit without such a groove may provide adequate support in some cases.

It will be appreciated that while we have described a preferred type of heating composition for our devices, other types may be employed, though generally to less advantage, such as those which depend upon hydration, heat of solution, fusion or precipitation, etc. We prefer such compositions which are substantially odorless or are made so through the use of adsorbents such as charcoal, silica gel, diatomaceous earth, and the like. We also prefer to choose ingredients such that the composition is hydrophilic rather than hydrophobic in nature, so as to minimize any difficulty of distributing the activating solution and also to take up the water and promote coherency of the composition, thereby avoiding spillage as mentioned above. The activating liquid will usually be water but other liquids such as alcohols, glycerine, etc., can be used with certain formulations, and, of course, the activating liquid may include other reaction promoting ingredients in solution or suspension.

The heating characteristics of the device may be varied widely, depending on the choice of chemicals which in turn will be dictated by the intended use. By varying the concentrations and proportions of the components of the formula disclosed above, a wide range of heating performances can be realized, the above formula being designed for generating temperatures of the order of about 180° to 220° F. which we find desirable for warming foods as distinguished from actual cooking which may require a higher heat.

The dimensions of our heating device and containers with which they are associated can, of course, vary widely. We have made heating devices according to FIG. 1 for example 6 inches in overall diameter, with a 4 inch diameter heating composition cavity ⅜ inch deep containing sixty grams of a heating composition of the formula given about, activated with about 10 to 30 cc. of water. In general, we use one to two ounces or more of heating composition, with about two ounces generally optimum. Used with receptacles as illustrated in the drawing, a single device of these dimensions is able to keep as much as two quarts of food contents hot for an hour or longer. The contents to be heated may be liquid, semi-solid or solid.

Simplicity of design of our heating devices and receptacles of which they may be a part, provides suitability for large scale automatic manufacture at required low cost. By forming or using the heating device as the receptacle bottom as illustrated in several figures of the drawing, very little cost is added to that of a complete receptacle without provision for heating.

It will be appreciated that we have described and illustrated only preferred embodiments of the invention and that modification and changes in various details thereof are permissible within the spirit and scope of the invention.

We claim:

1. For use in combination, a receptacle having a bottom wall and surrounding side wall connected thereto, said bottom wall having at least a portion thereof inwardly offset from the bottom end of said side wall, and a container of chemical heating composition, said container having a substantially rigid surrounding rim, said inwardly offset bottom portion and said container being so constructed and dimensioned that said container rim may be received within and frictionally engage the periphery of said offset bottom portion to removably support said container above the bottom end of said side wall.

2. In combination, a receptacle having a bottom wall and an upstanding side wall surrounding said bottom wall, said side wall being formed of resilient material, a container of a chemical composition adapted to emit heat upon activation with liquid and a support for said container comprising a substantially rigid rim shaped and adapted to seat within said side wall and to frictionally engage said wall to couple said container adjacent said bottom wall in heat-transfer relation to the contents of said receptacle, said side wall being provided with a groove in the interior face thereof surrounding said bottom wall and at a uniform short distance therefrom, and said rim being adapted to seat within said groove.

3. The combination according to claim 2 wherein said groove is located above said bottom wall.

4. The combination according to claim 1 wherein said inwardly offset portion forms with said side wall a channel U-shaped in cross-section and open interiorly of said receptacle.

5. For use in combination, a tubular member forming the enclosing side wall of a receptacle, and a heating device removably attachable within the tubular member to heat the interior thereof, said heating device comprising a container and a dry chemical composition therein which composition emits heat and vapor upon activation with liquid, said container including: a concave, impervious wall member forming therein a chemical-containing cavity of greater transverse dimensions than depth and of sufficient capacity to contain said composition and the quantity of liquid required to activate the composition; a flexible wall member overlying and confining said composition in said cavity, said flexible wall member being substantially impervious to said dry composition and being adapted to admit activating liquid to and escape of vapors from said composition through said flexible wall member; and a substantially rigid rim projecting laterally outwardly from said concave wall member about said cavity; said tubular member being provided with transversely opposite inwardly extending inner wall portions positioned above the bottom end of said member, said tubular member and said container being so constructed and dimensioned that said container may be inserted bodily within one end of said tubular member and so that said rim will engage said opposed inner wall portions of said tubular member to support and suspend said container above the bottom end of said tubular member, whereby when said bottom end is rested on a surface, said container is supported above and in spaced relation to the surface.

6. The combination according to claim 5 wherein said concave, impervious wall member and said rim are rigid and integral.

7. The combination according to claim 6 wherein said flexible wall member comprises a sheet of readily puncturable foil adhesively secured at its edges to said rim.

8. The combination according to claim 5 wherein said flexible wall member comprises a sheet of liquid-permeable material adhesively secured at its edges to said rim.

9. The combination according to claim 5 wherein said inwardly extending portions comprise the bottom of a peripheral groove in the inner wall of said tubular member.

References Cited in the file of this patent

UNITED STATES PATENTS

| | | |
|---|---|---|
| 802,256 | Bamberger et al. | Oct. 17, 1905 |
| 1,452,239 | Gutlin | Apr. 17, 1923 |
| 2,126,734 | Chancey | Aug. 16, 1938 |
| 2,384,720 | Babcock et al. | Sept. 11, 1945 |
| 2,533,958 | Root et al. | Dec. 12, 1950 |
| 2,553,878 | Steven | May 22, 1951 |
| 2,693,793 | Steven | Nov. 9, 1954 |

FOREIGN PATENTS

| | | |
|---|---|---|
| 8,150 | Great Britain | 1908 |
| 24,270 | Great Britain | 1910 |